United States Patent
Ogino

(10) Patent No.: US 9,762,816 B2
(45) Date of Patent: Sep. 12, 2017

(54) VIDEO PROCESSING APPARATUS, CAMERA APPARATUS, VIDEO PROCESSING METHOD, AND PROGRAM

(71) Applicant: PANASONIC INTELLECTUAL PROPERTY MANAGEMENT CO., LTD., Osaka-shi, Osaka (JP)

(72) Inventor: Ryoji Ogino, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 79 days.

(21) Appl. No.: 14/725,562

(22) Filed: May 29, 2015

(65) Prior Publication Data

US 2015/0264275 A1    Sep. 17, 2015

Related U.S. Application Data

(63) Continuation of application No. 13/883,786, filed as application No. PCT/JP2011/006883 on Dec. 9, 2011, now Pat. No. 9,049,384.

(30) Foreign Application Priority Data

Dec. 14, 2010   (JP) ................. 2010-277816

(51) Int. Cl.
    *H04N 5/232* (2006.01)
    *H04N 5/272* (2006.01)
    *H04N 5/265* (2006.01)

(52) U.S. Cl.
    CPC ......... *H04N 5/272* (2013.01); *H04N 5/23219* (2013.01); *H04N 5/23238* (2013.01); *H04N 5/23293* (2013.01); *H04N 5/265* (2013.01)

(58) Field of Classification Search
    CPC .... H04N 5/21; H04N 21/426; H04N 21/4316; H04N 5/45; H04N 21/440263
    See application file for complete search history.

(56) References Cited

U.S. PATENT DOCUMENTS

| 6,456,335 B1 | 9/2002 | Miura et al. |
| 7,839,926 B1* | 11/2010 | Metzger ................ H04N 5/144 375/240.01 |

(Continued)

FOREIGN PATENT DOCUMENTS

| JP | 11-234654 | 8/1999 |
| JP | 11-261868 | 9/1999 |

(Continued)

OTHER PUBLICATIONS

International Search Report, mailed Mar. 13, 2012, for International Application No. PCT/JP2011/006883.

(Continued)

*Primary Examiner* — Roberto Velez
*Assistant Examiner* — Tuan Le
(74) *Attorney, Agent, or Firm* — Greenblum & Bernstein, P.L.C.

(57) ABSTRACT

A video processing apparatus analyzes an input video input from a video input unit, detects a plurality of moving bodies included in the input video, determines a main moving body and a sub moving body, and determines a sub picture position for superimposing and displaying a sub video in a main video in a picture-in-picture form. This video processing apparatus performs cut-out processing on the main video and the sub video from the input video, and synthesizes the cut-out main video and sub video to generate a picture-in-picture synthesized video in which the sub video is superimposed at the sub picture position of the main video in the (Continued)

picture-in-picture form. The picture-in-picture synthesized video is output in one stream.

13 Claims, 9 Drawing Sheets

(56) References Cited

U.S. PATENT DOCUMENTS

| | | | |
|---|---|---|---|
| 2003/0160876 A1* | 8/2003 | Miyao | H04N 9/735 348/223.1 |
| 2004/0155982 A1 | 8/2004 | Jeong | |
| 2004/0201780 A1 | 10/2004 | Kim | |
| 2006/0255986 A1 | 11/2006 | Takanezawa et al. | |
| 2007/0058080 A1* | 3/2007 | Son | H04N 5/21 348/565 |
| 2008/0068504 A1 | 3/2008 | Shimizu | |
| 2009/0009424 A1* | 1/2009 | Kang | H04N 21/4728 345/1.3 |
| 2009/0009598 A1 | 1/2009 | Sotodate | |
| 2009/0147139 A1 | 6/2009 | Watanabe et al. | |
| 2009/0201424 A1* | 8/2009 | Ueda | H04N 5/45 348/565 |
| 2010/0092438 A1 | 4/2010 | Fruehauf et al. | |
| 2010/0103318 A1 | 4/2010 | Wang et al. | |
| 2010/0141772 A1 | 6/2010 | Inaguma et al. | |
| 2010/0218228 A1 | 8/2010 | Walter | |
| 2012/0147246 A1 | 6/2012 | Dent et al. | |

FOREIGN PATENT DOCUMENTS

| | | |
|---|---|---|
| JP | 2004-289779 | 10/2004 |
| JP | 2005-072840 | 3/2005 |
| JP | 2006-319526 | 11/2006 |
| JP | 2009-157763 | 7/2009 |
| JP | 2010-136099 | 6/2010 |

OTHER PUBLICATIONS

International Preliminary Report On Patentability, mailed Jun. 27, 2013, for International Application No. PCT/JP2011/006883.
Japan Office Action, mailed Jul. 29, 2014, for corresponding Japanese Application No. 2010-277816.

* cited by examiner

FIG.2
(a)
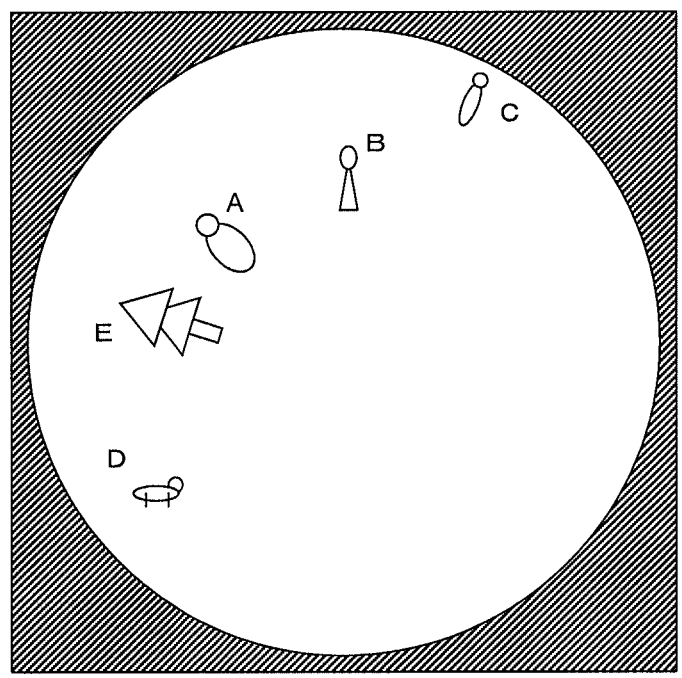
(b)
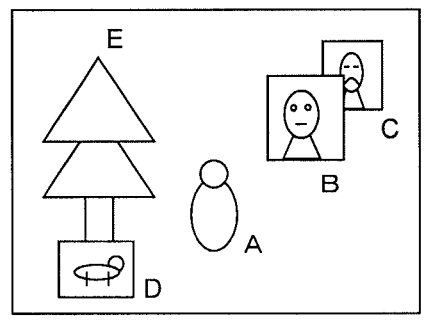

FIG.3
(a)
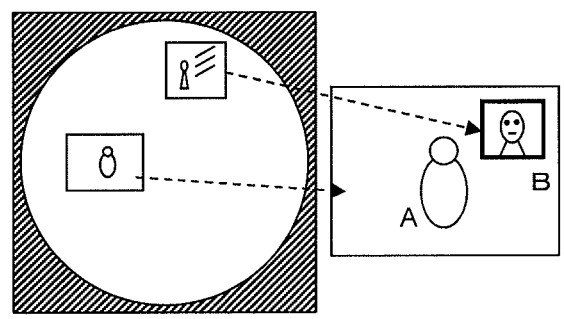
(b)
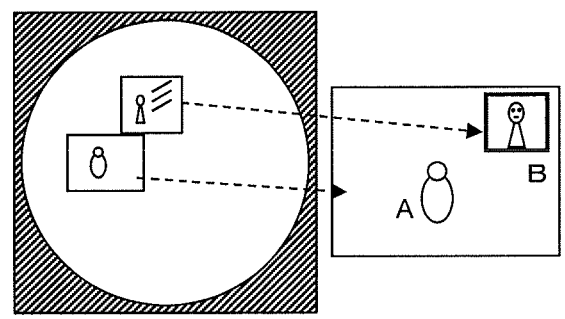
(c)
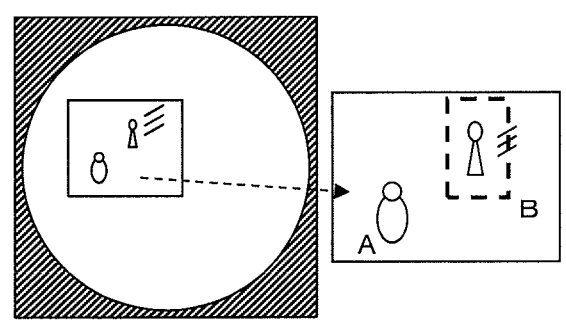

FIG.4
(a)
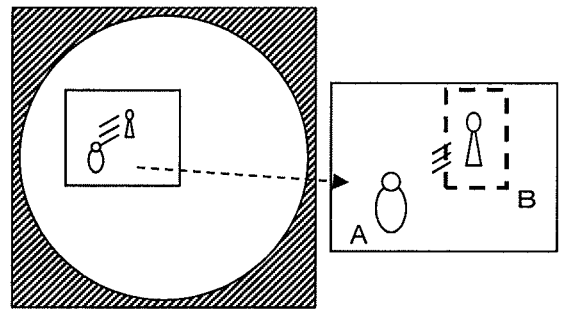
(b)
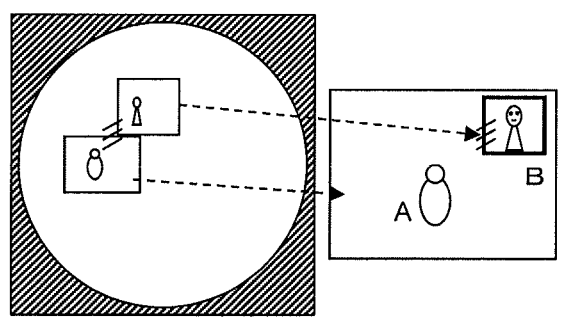
(c)
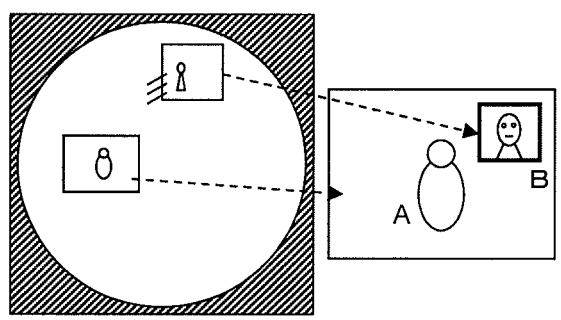

FIG.5
(a)
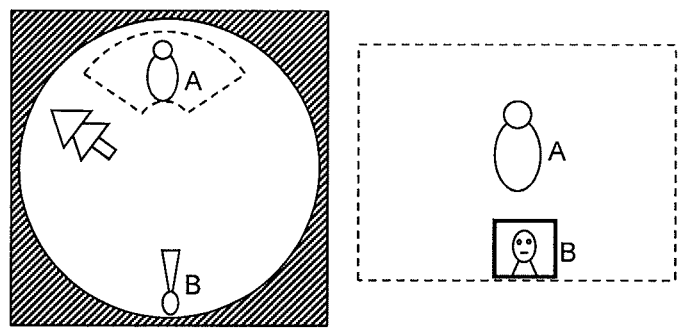
(b)
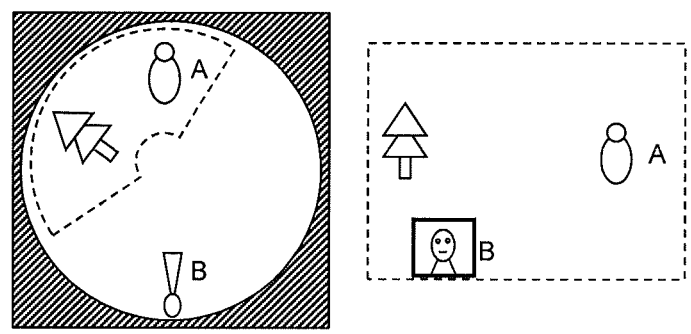
(c)
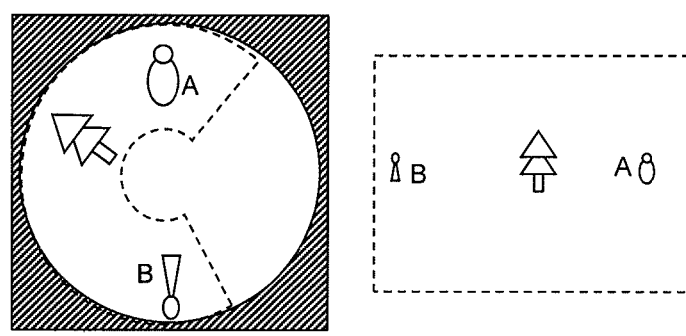

FIG.6
(a)
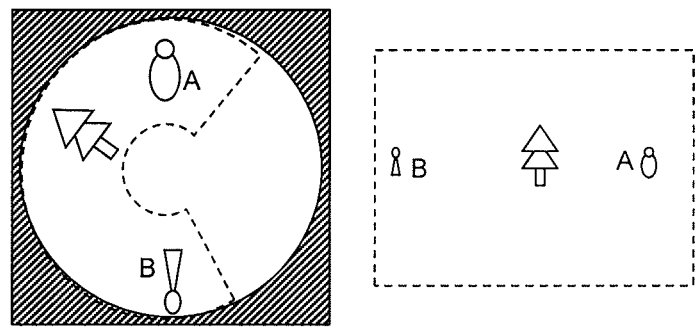
(b)
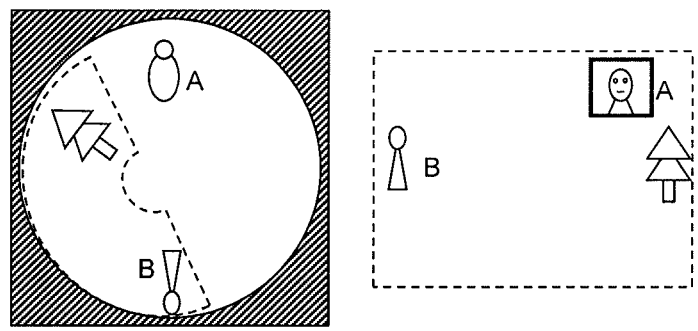
(c)
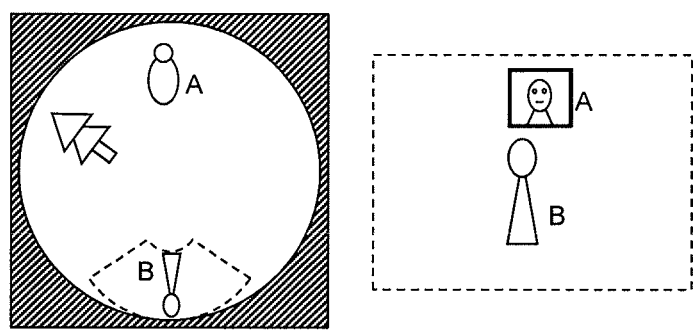

FIG.7
(a)
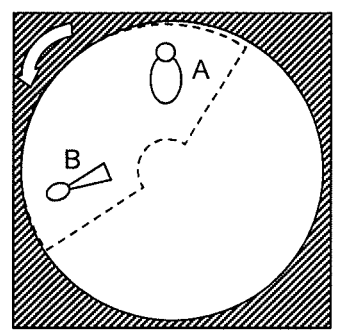
(b)
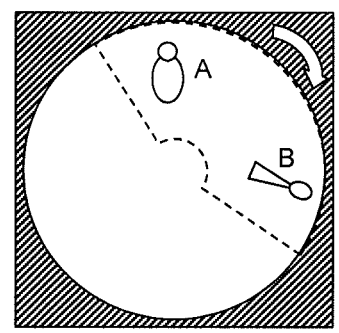

VIDEO PROCESSING APPARATUS, CAMERA APPARATUS, VIDEO PROCESSING METHOD, AND PROGRAM

CROSS REFERENCE TO RELATED APPLICATION

This is a continuation application of U.S. application Ser. No. 13/883,786 filed on May 7, 2013 which is a National Stage of International Application No. PCT/JP2011/006883 which was filed on Dec. 9, 2011 which claims priority to Japanese Application No. 2010-277816 filed Dec. 14, 2010, the disclosures of which are expressly incorporated herein by reference in their entireties.

BACKGROUND ART

Heretofore, there is known a system for processing a video (wide angle video) captured by a camera (wide angle camera) capable of capturing an image in a wider angle range than a normal camera (for example, see Patent Literature 1). One such a known system detects a plurality of moving bodies from a wide angle video captured by a wide angle camera, cuts out a video (area including the moving bodies) for displaying the moving bodies from the wide angle video for each moving body, and divides the videos of the moving bodies into the respective windows for display (multi-window display).
Such a related art system includes a function of transmitting videos of a plurality of moving bodies separately in a plurality of streams, and a plurality of screens for displaying videos of a plurality of moving images, so as to achieve a multi-window display.

However, it is necessary for the related art system of the multi-window display to include a function of transmitting videos of a plurality of moving bodies separately in a plurality of streams (multi-stream function), and a plurality of screens (multi-monitor) for displaying videos of a plurality of moving images, so as to achieve a multi-window display. For this reason, the related art system cannot be applied to a system including no multi-stream function and multi-monitor (for example, a system of a single-window display for transmitting one video in one stream and displaying the video on one screen).

It is impossible for the related art system of the multi-window display to be provided with screens in a non-limitative manner (the number of screens is limited). Accordingly, when the number of moving bodies to be displayed is larger than the number of screens, not all the moving bodies can be displayed on the screens (the number of screens is insufficient for displaying all the moving bodies).

CITATION LIST

Patent Literature

[Patent Literature 1] Japanese Patent Laid-Open No. 2004-289779

SUMMARY OF INVENTION

Technical Problem

The present invention has been made under the above-mentioned circumstances. It is an object of the present invention to provide a video processing apparatus which is also applicable to a single-window display and is capable of displaying a number of moving bodies without limitation of the number of screens, unlike a multi-window display.

Solution to Problem

One aspect of the present invention is a video processing apparatus. This video processing apparatus includes: a moving body detection unit that detects a moving body included in an input video input from a video input unit; a main/sub determination unit that determines one main moving body and at least one sub moving body from among a plurality of moving bodies when the moving body detection unit detects a plurality of moving bodies; a sub picture position determination unit that determines a sub picture position when a sub video for displaying the sub moving body is superimposed and displayed in a picture-in-picture form in a main video for displaying the main moving body; a cut-out unit that performs cut-out processing on the main video and the sub video from the input video; a synthesized video generation unit that generates a picture-in-picture synthesized video in which the sub video cut out by the cut-out unit is superimposed at the sub picture position of the main video cut out by the cut-out unit; and a video output unit that outputs a picture-in-picture synthesized video in one stream.

Another aspect of the present invention is a camera apparatus. This camera apparatus includes: an imaging unit; a moving body detection unit that detects a moving body included in an input video input from the imaging unit; a main/sub determination unit that determines one main moving body and at least one sub moving body from among a plurality of moving bodies when the moving body detection unit detects a plurality of moving bodies; a sub picture position determination unit that determines a sub picture position when a sub video for displaying the sub moving body is superimposed and displayed in a picture-in-picture form in a main video for displaying the main moving body; a cut-out unit that performs cut-out processing on the main video and the sub video from the input video; a synthesized video generation unit that generates a picture-in-picture synthesized video in which the sub video cut out by the cut-out unit is superimposed in the picture-in-picture form at the sub picture position of the main video cut out by the cut-out unit; and a video output unit that outputs a picture-in-picture synthesized video in one stream.

Another aspect of the present invention is a video processing method. This video processing method includes: detecting a moving body included in an input video input from a video input unit; determining one main moving body and at least one sub moving body from among a plurality of moving bodies upon detection of the plurality of moving bodies; determining a sub picture position when a sub video for displaying the sub moving body is superimposed and displayed in a picture-in-picture form in a main video for displaying the main moving body; performing cut-out processing on the main video and the sub video from the input video; generating a picture-in-picture synthesized video in which the cut-out sub video is superimposed in the picture-in-picture form at the sub picture position of the cut-out main video; and outputting the picture-in-picture synthesized video in one stream.

Another aspect of the present invention is a program for video processing. This program causes a computer to execute processing of: detecting a moving body included in an input video input from a video input unit; determining one main moving body and at least one sub moving body from among a plurality of moving bodies upon detection of the plurality of moving bodies; determining a sub picture position when a sub video for displaying the sub moving body is superimposed and displayed in a picture-in-picture form in a main video for displaying the main moving body; performing cut-out processing on the main video and the sub video from the input video; generating a picture-in-picture synthesized video in which the cut-out sub video is superimposed in the picture-in-picture at the sub picture position of the cut-out main video; and outputting the picture-in-picture synthesized video in one stream.

As described below, the present invention has other aspects. Accordingly, the disclosure of the invention aims to provide exemplary aspects of the present invention, and does not aim to limit the scope of the invention claimed herein.

BRIEF DESCRIPTION OF DRAWINGS

FIGS. 2(a) and (b) are explanatory diagrams illustrating generation of a picture-in-picture synthesized video.

FIGS. 3(a-c) are explanatory diagrams illustrating switching processing for a video when a sub moving body approaches a main moving body.

FIGS. 4(a-c) are explanatory diagrams illustrating switching processing for a video when a sub moving body is apart from a main moving body.

FIGS. 5(a-c) are explanatory diagrams of switching processing for a main moving body.

FIGS. 6(a-c) are explanatory diagrams of switching processing for a main moving body.

FIGS. 7(a) and (b) are explanatory diagrams illustrating a direction in which an angle of view is widened.

DESCRIPTION OF EMBODIMENTS

Figure 1:
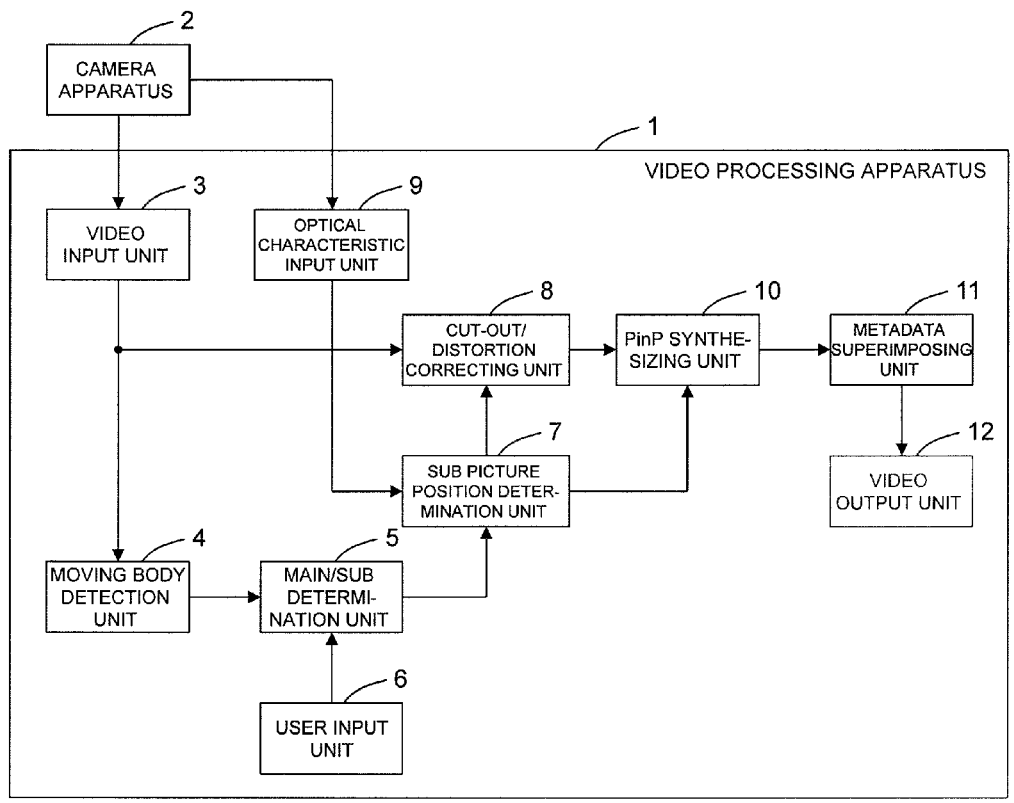
FIG. 1 is a block diagram illustrating a video processing apparatus according to a first embodiment of the present invention.

The present invention will be described in detail below. However, the invention is not limited by the following detailed description and the accompanying drawings.

A video processing apparatus of the present invention has a configuration including: a moving body detection unit that detects a moving body included in an input video input from a video input unit; a main/sub determination unit that determines one main moving body and at least one sub moving body from among a plurality of moving bodies when the moving body detection unit detects a plurality of moving bodies; a sub picture position determination unit that determines a sub picture position when a sub video for displaying the sub moving body is superimposed and displayed in a main video for displaying a main moving body; a cut-out unit that performs cut-out processing on the main video and the sub video from the input video; a synthesized video generation unit that generates a picture-in-picture synthesized video in which the sub video cut out by the cut-out unit is superimposed in the picture-in-picture form at the sub picture position of the main video cut out by the cut-out unit; and a video output unit that outputs a picture-in-picture synthesized video in one stream.

With this configuration, when the input video includes a plurality of moving bodies, the videos (main video and sub video) of the plurality of moving bodies can be output as the synthesized video (picture-in-picture synthesized video) in which the videos are superimposed in the picture-in-picture form in one stream (single stream). In this case, the videos of the plurality of moving bodies can be combined into one stream in the picture-in-picture form, which also provides applicability to the related art system of the single-window display. Since the plurality of moving bodies is displayed on one screen in the picture-in-picture form, a number of moving bodies can be displayed without limitation of the number of screens, unlike the related art system of the multi-window display.

In the video processing apparatus of the present invention, the input video may be captured by a wide angle camera, and the video processing apparatus may be configured to include a distortion/rotation correcting unit that corrects distortion and rotation of a video due to optical characteristics of the lens of the wide angle camera with respect to the main video and the sub video which are cut out by the cut-out unit.

With this configuration, the picture-in-picture synthesized video can be generated using the input video captured by the wide angle camera. In this case, distortion and rotation of a video due to optical characteristics of the lens of the wide angle camera are appropriately corrected. Accordingly, even when distortion occurs in the videos of the main moving body and the sub moving body and the directions of the main moving body and the sub moving body are not aligned in the input video captured by a fisheye lens camera installed on the ceiling, for example, a clear video in which no distortion occurs and the main moving body and the sub moving body are unified in direction is obtained in the picture-in-picture synthesized video. The term "wide angle camera" herein described refers to a camera including a lens (a fisheye lens, a semi-wide angle lens, a wide angle lens, a super-wide angle lens, or the like) having a wider angle of view than a standard lens.

In the video processing apparatus of the present invention, the moving body detection unit may be configured to analyze the input video to obtain a relative position of each of the plurality of moving bodies, and determine a sub picture position depending on the relative position of the sub moving body with respect to the main moving body.

With this configuration, the sub picture position is determined depending on the relative position of the sub moving body with respect to the main moving body. Accordingly, the positional relationship between the plurality of moving bodies (main moving body and sub moving body) is easily recognized as compared with the related art system of the multi-window display.

In the video processing apparatus of the present invention, when the sub moving body, which is not included in the main video, approaches the main moving body and the distance between the main moving body and the sub moving body is equal to or smaller than the predetermined value, the cut-out unit may be configured to cut out the main video at a zoomed-out angle of view until the sub moving body is included in the main video. The sub picture position determination unit may be configured to determine the position of the sub moving body in the main video as the sub picture position. The synthesized video generation unit may be configured to generate the picture-in-picture synthesized video in which the sub video of the sub moving body in the main video is superimposed, and then stop generating the picture-in-picture synthesized video. The video output unit may be configured to output the picture-in-picture synthesized video in which the sub video is superimposed at the position of the sub moving body in the main video, and output the main video on which the sub video is not superimposed.

With this configuration, when the sub moving body approaches the main moving body, the angle of view is zoomed-out until the sub moving body is included in the main video, and the picture-in-picture synthesized video in which the sub video is superimposed at the position of the sub moving body in the main video is generated. After that, the synthesis of the main video and the sub video (generation of the picture-in-picture synthesized video) is stopped, and the main video in which the sub video is not superimposed (normal single-window picture) is output. Thus, a shift (switching) from the picture-in-picture synthesized video to the normal single-window picture is smoothly performed.

In the video processing apparatus of the present invention, when the sub moving body included in the main video is apart from the main moving body and the distance between the main moving body and the sub moving body is equal to or larger than the predetermined value, the synthesized video generation unit may be configured to generate the picture-in-picture synthesized video in which the sub video is superimposed at the sub picture position again, and the video output unit may be configured to output the picture-in-picture synthesized video in which the sub video is superimposed at the sub picture position.

With this configuration, when the sub moving body is apart from the main moving body after the shift from the picture-in-picture synthesized video to the normal single-window picture, the synthesis of the main video and the sub video (generation of the picture-in-picture synthesized video) is resumed, and the picture-in-picture synthesized video in which the sub video is superimposed at the sub picture position is output. Thus, the shift (switching) from the normal single-window picture to the picture-in-picture synthesized video is smoothly performed.

In the video processing apparatus of the present invention, when the main moving body is switched from a first moving body to a second moving body, the cut-out unit may be configured to cut out the main video at a zoomed-out angle of view until the first moving body and the second moving body are included in the main video, and then cut out the main video at a zoomed-in angle of view until the second moving body is included in the main video and the first moving body is not included in the main video.

With this configuration, when switching of the main moving body (switching from the first moving body to the second moving body) is performed, the angle of view is temporarily zoomed-out until two main moving bodies (first moving body and second moving body) obtained before and after switching, and then the main moving body (second moving body) obtained after the switching is zoomed-in. Accordingly, the positional relationship between the two main moving bodies obtained before and after switching is easily recognized.

In the video processing apparatus of the present invention, the input video may be captured by an omnidirectional camera, and the cut-out unit may be configured to set a direction in which the zoomed-out angle of view is widened until the first moving body and the second moving body are included in the main video, as a direction in which an angle formed between an azimuth of the first moving body and an azimuth of the second moving body is small.

With this configuration, when switching of the main moving body (switching from the first moving body to the second moving body) is performed, a direction in which the zoomed-out angle of view is increased until the first moving body and the second moving body are included in the main video is appropriately determined as a direction in which an angle formed between an azimuth of the first moving body and an azimuth of the second moving body is small. The term "omnidirectional camera" herein described refers to a camera including a lens (fisheye lens or the like) capable of capturing an omnidirectional (360-degree) image.

In the video processing apparatus of the present invention, the main/sub determination unit may be configured to determine, as the main moving body, a moving body which is detected first in times series when the moving body detection unit detects a plurality of moving bodies.

With this configuration, a moving body which is detected first in time series from among the plurality of moving bodies included in the input video is determined as the main moving body to be displayed in the main video. The moving body detected first in time series is appropriate as the main moving body, because the moving body is an important monitoring target in many cases.

In the video processing apparatus of the present invention, the main/sub determination unit may be configured to determine, as the main moving body, a moving body which is located at a position closest to a center-of-gravity position of the plurality of moving bodies obtained from each position of the plurality of moving bodies, when the moving body detection unit detects a plurality of moving bodies.

With this configuration, a moving body located at a position closest to a center-of-gravity position of a plurality of moving bodies is determined as the main moving body to be displayed in the main video, from among the plurality of moving bodies included in the input video. The moving body located at the center of the plurality of moving bodies is determined as the main moving body, so that other moving bodies (sub moving bodies) can be located in a well-balanced manner around the main moving body, thereby suppressing occurrence of deviation of sub picture positions.

In the video processing apparatus of the present invention, the main/sub determination unit may be configured to determine, as the main moving body, a moving body determined by a user input, when the moving body detection unit detects a plurality of moving bodies.

With this configuration, the moving body determined by the user input is determined as the main moving body to be displayed in the main video, from among the plurality of moving bodies included in the input video. This makes it possible to select the moving body to be confirmed by the user in the video, as the main moving body.

In the video processing apparatus of the present invention, the main/sub determination unit may be configured to determine the main moving body based on attribute information on a plurality of moving bodies when the moving body detection unit detects a plurality of moving bodies.

With this configuration, the main moving body to be displayed in the main video is determined based on the attribute of each moving body, from among the plurality of moving bodies included in the input video. Examples of the attributes of each moving body include moving body types (human, animal, car, etc.). When the moving body is a human, the attributes include age, gender, and clothes (for example, color of clothes and presence or absence of glasses). Note that the attribute of this moving body can be obtained by analyzing the input video (for example, image analysis such as matching with a moving body model).

In the video processing apparatus of the present invention, the cut-out unit may be configured not to perform cut-out processing on a portion in which the sub video is superimposed, in the case of performing cut-out processing on the main video.

With this configuration, in the case of performing cut-out processing on the main video, cut-out processing is not performed on a portion in which the sub video is superimposed. This reduces the amount of operation required for the processing by that amount. The amount of operation required for the subsequent processing (processing for correcting distortion or rotation, for example) can also be reduced.

In the video processing apparatus of the present invention, the synthesized video generation unit may be configured to generate the picture-in-picture synthesized video by using a main video or a sub video of a previous frame when a main video or a sub video of a current frame is not changed from the main video or the sub video of the previous frame.

With this configuration, when the current frame is not changed from the previous frame, the synthesis of the main video and the sub video (generation of the picture-in-picture synthesized video) is carried out using the previous frame as it is, thereby reducing the amount of operation required for the processing by that amount.

The video processing apparatus of the present invention may be configured to include a metadata superimposing unit that superimposes, as metadata, attribute information on the main moving body or the sub moving body, on the picture-in-picture synthesized video.

With this configuration, the information on the main moving body and the sub moving body is superimposed as metadata on the picture-in-picture synthesized video. Accordingly, the type of the main moving body or the sub moving body can be easily recognized by referring to the metadata. As the information to be superimposed as metadata, information on the attribute of each moving body may be used, for example. As described above, examples of the attributes of each moving body include moving body types (human, animal, car, etc.). When the moving body is a human, the attributes include age, gender, and clothes (for example, color of clothes and presence or absence of glasses). The attribute of this moving body can be obtained by analyzing the input video (for example, image analysis such as matching with a moving body model).

A camera apparatus of the present invention includes an imaging unit; a moving body detection unit that detects a moving body included in an input video input from the imaging unit; a main/sub determination unit that determines one main moving body and at least one sub moving body from among a plurality of moving bodies when the moving body detection unit detects a plurality of moving bodies; a sub picture position determination unit that determines a sub picture position when a sub video for displaying the sub moving body is superimposed and displayed in a picture-in-picture form in a main video for displaying the main moving body; a cut-out unit that performs cut-out processing on the main video and the sub video from the input video; a synthesized video generation unit that generates a picture-in-picture synthesized video in which the sub video cut out by the cut-out unit is superimposed in the picture-in-picture form at the sub picture position of the main video cut out by the cut-out unit; and a video output unit that outputs a picture-in-picture synthesized video in one stream.

Like the video processing apparatus described above, also this camera apparatus can output, in one stream, the synthesized video (picture-in-picture synthesized video) in which the videos (main video and sub video) of the plurality of moving bodies are superimposed in the picture-in-picture form when the input video includes a plurality of moving bodies. In this case, the videos of the plurality of moving bodies can be combined into one stream in the picture-in-picture form, which also provides applicability to the related art system of the single-window display. Since the plurality of moving bodies is displayed on one screen in the picture-in-picture form, a number of moving bodies can be displayed without limitation of the number of screens, unlike the related art system of the multi-window display.

In the camera apparatus of the present invention, the imaging unit may include a lens for a wide angle camera, and the camera apparatus may be configured to include a distortion/rotation correcting unit that corrects distortion and rotation of a video due to optical characteristics of the lens for the wide angle camera with respect to the main video and the sub video which are cut out by the cut-out unit.

With this configuration, the picture-in-picture synthesized video can be generated using the input video captured by the lens for the wide angle camera. In this case, distortion and rotation of a video due to optical characteristics of the lens for the wide angle camera are appropriately corrected. Accordingly, even when distortion occurs in the videos of the main moving body and the sub moving body and the directions of the main moving body and sub moving body are not aligned in the input video captured by a fisheye lens camera installed on the ceiling, for example, a clear video in which no distortion occurs and the directions of the main moving body and the sub moving body are aligned can be obtained in the picture-in-picture synthesized video. Note that the term "a lens for a wide angle camera" herein described refers to a lens (a fisheye lens, a semi-wide angle lens, a wide angle lens, a super-wide angle lens, etc.) having a wider angle of view than a standard lens.

A video processing method according to the present invention includes: detecting a moving body included in an input video input from a video input unit; determining one main moving body and at least one sub moving body from among a plurality of moving bodies upon detection of a plurality of moving bodies; determining a sub picture position when a sub video for displaying the sub moving body is superimposed and displayed in a picture-in-picture form in a main video for displaying the main moving body; performing cut-out processing on the main video and the sub video from the input video; generating a picture-in-picture synthesized video in which the cut-out sub video is superimposed in the picture-in-picture form at the sub picture position of the cut-out main video; and outputting the picture-in-picture synthesized video in one stream.

Like the video processing apparatus described above, also this method enables the videos (main video and sub video) of the plurality of moving bodies to be output in one stream as the synthesized video (picture-in-picture synthesized video) in which the videos are superimposed in the picture-in-picture form, when the input video includes a plurality of moving bodies. In this case, videos of the plurality of moving bodies can be combined into one stream in the picture-in-picture form, which also provides applicability to the related art system of the single-window display. A plurality of moving bodies is displayed on one screen in the picture-in-picture form. Accordingly, a number of moving bodies can be displayed without limitation of the number of screens, unlike the related art system of the multi-window display.

A program according to the present invention is a program for video processing, the program causing a computer to execute processing of: detecting a moving body included in an input video input from a video input unit; determining one main moving body and at least one sub moving body from among a plurality of moving bodies upon detection of a plurality of moving bodies; determining a sub picture position when a sub video for displaying the sub moving body is superimposed and displayed in a picture-in-picture form in a main video for displaying the main moving body; performing cut-out processing on the main video and the sub video from the input video; generating a picture-in-picture synthesized video in which the cut-out sub video is superimposed in the picture-in-picture form at the sub picture position of the cut-out main video; and outputting the picture-in-picture synthesized video in one stream.

Like the video processing apparatus described above, also this program enables the videos (main video and sub video) of a plurality of moving bodies to be output in one stream as a synthesized video (picture-in-picture synthesized video) when the input video includes the plurality of moving bodies. In this case, videos of a plurality of moving bodies can be combined into one stream in the picture-in-picture form, which also provides applicability to the related art system of the single-window display. A plurality of moving bodies is displayed on one screen in the picture-in-picture form. Accordingly, a number of moving bodies can be displayed without limitation of the number of screens, unlike the related art system of the multi-window display.

According to the present invention, it is possible to output videos of a plurality of moving bodies cut out from an input video as a synthesized video in which the videos are superimposed in the picture-in-picture form. In addition, the present invention is applicable to a system of a single-window display and is capable of displaying a number of moving bodies without limitation of the number of screens, unlike a multi-window display.

The video processing apparatus according to an embodiment of the present invention will be described below with reference to the drawings. This embodiment illustrates a case where the video processing apparatus is used for a system that monitors a predetermined monitor area (shop, train station, etc.), for example. This video processing apparatus has a function of outputting videos of a plurality of moving bodies cut out from an input video as a synthesized video in which the videos are superimposed in the picture-in-picture form. This function can be implemented by a program stored in a memory of a video processing apparatus, for example.

First Embodiment

A configuration of a video processing apparatus according to a first embodiment of the present invention will be described with reference to the drawings. FIG. 1 is a block diagram illustrating the configuration of the video processing apparatus of this embodiment. As illustrated in FIG. 1, a video processing apparatus 1 includes a video input unit 3 that receives a video (input video) captured by a camera apparatus 2; a moving body detection unit 4 that analyzes the input video (image analysis) and detects a moving body included in the input video; and a main/sub determination unit 5 that determines one main moving body and other sub moving bodies from among a plurality of moving bodies upon detection of a plurality of moving bodies. In this embodiment, a moving body having a highest priority among the plurality of moving bodies is determined as a main moving body.

The camera apparatus 2 is a fisheye lens camera installed on the ceiling, for example. The fisheye lens camera is capable of capturing a wider angle of view than a normal camera, and is also called a wide angle camera. The fisheye lens camera is capable of capturing an omnidirectional (360 degrees) image with the camera as a center, and is also called as an omnidirectional camera.

For example, FIG. 2(a) illustrates an example of the input video captured by the camera apparatus 2. The input video illustrated in FIG. 2(a) includes four moving bodies (three persons A to C and one animal D) and one static body (one tree E). In this case, the moving body detection unit 4 analyzes the input video (image analysis), thereby detecting four moving bodies (three persons A to C and one animal D) included in the input video. The moving body detection unit 4 can obtain each position (relative position) of a plurality of moving bodies by analyzing the input video. Each position (relative position) of a plurality of moving bodies may be simply represented as an upper, lower, left, or right position, polar coordinates (rθ coordinates), or xy coordinates, for example. The moving body detection unit 4 has a function of imparting moving body information (ID information, position information, size information, thumbnail image) to each moving body, upon detecting moving bodies from the input video.

Then, the main/sub determination unit 5 determines one main moving body (for example, a person A) and other sub moving bodies (for example, persons B and C and an animal D) from among four moving bodies (three persons A to C and one animal D) which are detected by the moving body detection unit 4. In this case, the main/sub determination unit 5 may determine, as the main moving body, a moving body (moving body assigned with a minimum ID in the case of assigning IDs in time series) which is detected first in times series by the moving body detection unit 4. Alternatively, the main/sub determination unit 5 may determine, as the main moving body, a moving body which is located at a position closest to a center-of-gravity position of a plurality of moving bodies (which is calculated from each position of a plurality of moving bodies). Alternatively, the main/sub determination unit 5 may determine, as the main moving body, a moving body which is designated by a user using a user input unit 6 (an input key, an operation button, or the like). More alternatively, the main/sub determination unit 5 may determine the main moving body based on attributes of a plurality of moving bodies.

Examples of the attributes of moving bodies include moving body types (human, animal, car, etc.). When the moving body is a human, the attributes include age, gender, and clothes (for example, color of clothes and presence or absence of glasses). Note that the attributes of the moving bodies can be obtained by analyzing the input video (for example, image analysis such as matching with a moving body model).

As illustrated in FIG. 1, the video processing apparatus 1 includes a sub picture position determination unit 7 that determines a sub picture position when a sub video for displaying each sub moving body is superimposed and displayed in a picture-in-picture form (PinP form) in a main video for displaying the main moving body. For example, FIG. 2(b) illustrates an example of the picture-in-picture synthesized video (PinP synthesized video). In this case, the sub video for displaying the other sub moving bodies (persons B and C, and animal D) is superimposed in the main video for displaying the main moving body (person A).

The sub picture position determination unit 7 determines the sub picture position depending on the relative position of each sub moving body with respect to the main moving body. For example, when one main moving body (person A) and other sub moving bodies (persons B and C and animal D) are detected from the input video illustrated in FIG. 2(a), it is assumed that the relative position of the sub moving body "person B" is obtained as "a position on the right of the person A, on the left of the person C, and on the right of the animal D"; the relative position of the sub moving body "person C" is obtained as "a position on the right of the person A, on the right of the person B, and on the right of the animal D"; and the relative position of the sub moving body "animal D" is obtained as "a position on the left of the person A, on the left of the person B, and on the left of the person C".

In this case, as illustrated in FIG. 2(b), the position (sub picture position) of the sub video for displaying the sub moving body "person B" is determined as "a position on the right of the person A, on the left of the sub video of the person C, and on the right of sub video of the animal D in the main video". Similarly, the position of the sub video for displaying the sub moving body "person C" is determined as "a position on the right of the person A, on the right of the sub video of the person B, and the right of the sub video of the animal D in the main video". The position of the sub video for displaying the sub moving body "animal D" is determined as "a position on the left of the person A, on the left of the sub video of the person B, and on the left of the sub video of the animal D in the main video".

As illustrated in FIG. 1, the video processing apparatus 1 includes a cut-out/distortion correcting unit 8 that cuts out the main video and sub videos from the input video, and corrects distortion and rotation of videos due to the optical characteristics of the lens (for example, fisheye lens) of the camera apparatus 2. In this case, optical characteristic information (lens specification information) on the lens of the camera apparatus 2 is input from an optical characteristic input unit 9. Note that the cut-out/distortion correcting unit 8 may not process a portion (portion corresponding to the sub picture position) in which the sub video is superimposed, in the case of processing the main video (processing of cutting out or correcting distortion and rotation).

The video processing apparatus 1 further includes a picture-in-picture synthesizing unit (PinP synthesizing unit) 10 that synthesizes the main video and sub videos which are cut out and whose distortion and rotation are corrected by the cut-out/distortion correcting unit 8, and generates a PinP synthesized video in which the sub video is superimposed in the PinP form at the sub picture position in the main video. Note that the PinP synthesizing unit 10 may generate the PinP synthesized video by using the main video of the previous frame when the main video of the current frame is not changed from the main video of the previous frame. Similarly, the PinP synthesizing unit 10 may generate the PinP synthesized video by using the sub video of the previous frame when the sub video of the current frame is not changed from the sub video of the previous frame.

The video processing apparatus 1 includes a metadata superimposing unit 11 that superimposes, as metadata, information on the main moving body and sub moving bodies, on the PinP synthesized video; and a video output unit 12 that outputs the PinP synthesized video in one stream (single stream). Note that the information to be superimposed as metadata may be information on the attributes of each moving body, for example. As described above, examples of the attributes of each moving body include moving body types (human, animal, car, etc.). When the moving body is a human, the attributes include age, gender, and clothes (for example, color of clothes and presence or absence of glasses). The attributes of each moving body can be obtained by analyzing the input video (for example, image analysis such as matching with a moving body model).

The operation of the video processing apparatus 1 having the configuration as described above will be described with reference to the drawings.

Referring now to FIG. 3, a description is given of switching of videos (switching from PinP display to 1-window display) when the sub moving body which is not included in the main video approaches the main moving body. As illustrated in FIG. 3(a), when the distance between the main moving body (person A) and the sub moving body (person B) is larger than a certain value, the sub moving body is displayed in the PinP form in the main video as the sub video. Note that the distance between the main moving body (person A) and the sub moving body (person B) may be calculated as the number of pixels between moving bodies in the input video (the number of pixels corresponding to the distance between the centers of frames surrounding moving bodies), and the number of pixels may be converted into a real distance.

After that, as illustrated in FIG. 3(b), when the sub moving body approaches the main moving body and the distance between the main moving body and the sub moving body is equal to or smaller than a certain value, the PinP display is performed in which the angle of view of each of the main video and the sub video is zoomed-out and alignment is performed such that the sub picture position coincides with the position of the sub moving body in the main video. At this time, the cut-out/distortion correcting unit 8 cuts out the main video at the zoomed-out angle of view until the sub moving body is included in the main video, and the sub picture position determination unit 7 determines the position of the sub moving body in the main video as the sub picture position. Then, the PinP synthesizing unit 10 generates the PinP synthesized video in which the sub video is superimposed at the position of the sub moving body in the main video, and the video output unit 12 outputs the PinP synthesized video (PinP synthesized video in which the sub video is superimposed at the position of the sub moving body in the main video).

After completion of the alignment, as illustrated in FIG. 3(c), the PinP display is released to display the main video (main video including the sub moving body). That is, the display is switched from the PinP display to the 1-window display. At this time, the PinP synthesizing unit 10 stops synthesizing the main video and the sub video, and the video output unit 12 outputs the main video in which the sub video is not superimposed.

Referring next to FIG. 4, a description is given of switching of videos when the sub moving body included in the main video is apart from the main moving body (switching from the 1-window display to the PinP display). As illustrated in FIG. 4(a), when the distance between the main moving body (person A) and the sub moving body (person B) is equal to or smaller than a certain value, the sub moving body is displayed in the main video (1-window display).

After that, as illustrated in FIG. 4(b), when the sub moving body is apart from the main moving body and the distance between the main moving body and the sub moving body is larger than a certain value, the sub moving body in the main video is displayed in the PinP form in the main video as the sub video. At this time, the PinP synthesizing unit 10 starts synthesizing the main video and the sub video (resuming synthesis if the synthesis is stopped) and generates the PinP synthesized video in which the sub video is superimposed at the sub picture position. The video output unit 12 outputs the PinP synthesized video (PinP synthesized video in which the sub video is superimposed at the sub picture position).

Lastly, as illustrated in FIG. 4(c), the angle of vide of each of the main video and the sub video is zoomed-in. Thus, the display is switched from the 1-window display to the PinP display.

Referring next to FIGS. 5 and 6, processing for switching the main moving body will be described. For example, as illustrated in FIG. 5(a), when the main video is displayed using the person A as the main moving body and the person B is displayed in the PinP form as the sub moving body in the main video, it is assumed that the main moving body is switched from the person A to the person B.

In this case, first, the angle of view is zoomed-out so as to include the person B as illustrated in FIG. 5(b), and the angle of view is zoomed-out so as to include both the person A and the person B as illustrated in FIG. 5(c). At this time, the PinP display of the person B is temporarily released. After that, the angle of view is zoomed-in with the person B as the main moving body as illustrated in FIGS. 6(a) to 6(b). When the person A falls out of the angle of view of the main video of the person B, the PinP display is performed with the person A as the sub moving body. Then, as illustrated in FIG. 6(c), the angle of view is zoomed-in until the angle of view of the main video is centered on the person B.

In this case, the cut-out/distortion correcting unit 8 cuts out the main video at the zoomed-out angle of view until the person A and the person B are included in the main video, and then cuts out the main video at the zoomed-in angle of view until the person B is included in the main video and the person A is not included in the main video.

Referring now to FIG. 7, the direction in which the angle of view is zoomed-out upon switching of the main moving body will be described. For example, in the case of switching the main moving body from the person A to the person B, when the person B is located at the position on the left of the person A as illustrated in FIG. 7(a), the angle of view is widened in the left direction from the person A. As illustrated in FIG. 7(b), when the person B is located at the position on the right of the person A, the angle of view is widened in the right direction from the person A.

In this case, it can also be said that the cut-out/distortion correcting unit 8 determines the direction in which the angle of view is zoomed-out until the moving bodies of the person A and the person B are included in the main video, as the direction in which the angle formed between the azimuth of the person A and the azimuth of the person B is small. For example, in the example of FIG. 7(a), assuming that the azimuth of the person A is set as a reference (0 degrees), the azimuth of the person B is "120 degrees in the left direction or 240 degrees in the right direction". Accordingly, in this case, the "left direction" in which the angle formed between the azimuth of the person A and the azimuth of the person B is small is determined. Similarly, in the example of FIG. 7(b), assuming that the azimuth of the person A is set as a reference (0 degrees), the azimuth of the person B is "120 degrees in the right direction or 240 degrees in the left direction". Accordingly, in this case, the "right direction" in which the angle formed between the azimuth of the person A and the azimuth of the person B is small is determined.

Figure 8:
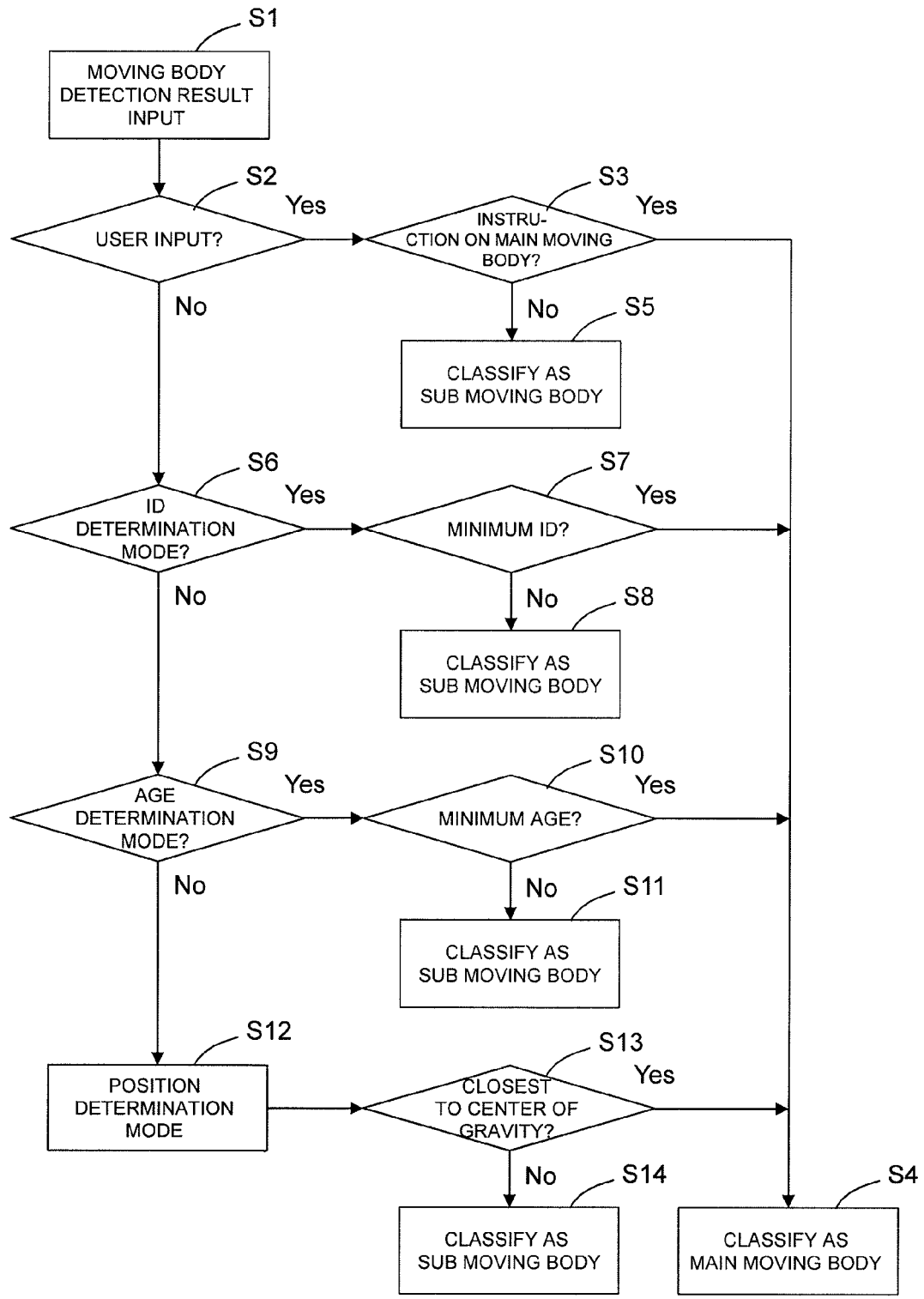
FIG. 8 is a flowchart for explaining a flow of determination processing for a main moving body and a sub moving body.

Lastly, referring to the flowchart of FIG. 8, a flow of processing of determining (classifying) the main moving body and the sub moving bodies will be described. As illustrated in FIG. 8, when a moving body is detected from an input video by the moving body detection unit 4 (S1), it is judged whether a user input (instruction by a user) is supplied from the user input unit 6 (S2). When there is a user input, it is judged whether the user input is an instruction on the main moving body (S3). As a result, if the user input indicates an instruction on the main moving body, the moving body is classified as the main moving body (S4), and if the user input is not an instruction on the main moving body, the moving body is classified as the sub moving body (S5).

When there is no user input, a judgment as to whether or not a mode for determining a time series (ID) as a key (ID determination mode) is set is made (S6). In the case of the ID determination mode, a judgment as to whether the ID assigned to the moving body is minimum or not is made (S7). As a result, if the ID is minimum, the moving body is classified as the main moving body (S4), and if the ID is not minimum, the moving body is classified as the sub moving body (S8).

In a mode other than the ID determination mode, a judgment as to whether a mode for determining an age as a key (age determination mode) is set is made (S9). In the age determination mode, a judgment as to whether or not the item "age" in the attribute of the moving body is minimum or not is made (S10). As a result, if the age is minimum, the moving body is classified as the main moving body (S4), and if the age is not minimum, the moving body is classified as the sub moving body (S11).

In a mode other than the age determination mode, a judgment as to whether the mode is a mode for determining a position as a key (position determination mode) is made (S12). In the position determination mode, a judgment as to whether the position of the moving body is located at a position closest to the center-of-gravity of all moving bodies is made (S13). As a result, if the moving body is located at the position closest to the center of gravity, the moving body is classified as the main moving body (S4), and if the moving body is not located at the position closest to the center of gravity, the moving body is classified as the sub moving body (S14).

The video processing apparatus 1 of the first embodiment as described above is capable of outputting videos of a plurality of moving bodies cut out from an input video in one stream (single stream) as a synthesized video in which the videos are superimposed in the picture-in-picture form, is applicable to the system of the single-window display, and is also capable of displaying a number of moving bodies without limitation of the number of screens, unlike the multi-window display.

That is, in this embodiment, when the input video includes a plurality of moving bodies as illustrated in FIG. 2, the videos (main video and sub video) of the plurality of moving bodies can be output in one stream as the synthesized video (picture-in-picture synthesized video) in which the videos are superimposed in the picture-in-picture form. In this case, the videos of the plurality of moving bodies can be combined into one stream in the picture-in-picture form, which also provides applicability to the related art system of the single-window display. Since the plurality of moving bodies can be displayed on one screen in the picture-in-picture form, a number of moving bodies can be displayed without limitation of the number of screens, unlike the related art system of the multi-window display.

In this embodiment, the picture-in-picture synthesized video can be generated using the input video captured by the camera apparatus 2 which is a wide angle camera. In this case, distortion and rotation of videos due to the optical characteristics of the wide angle camera are appropriately corrected by the cut-out/distortion correcting unit 8. Accordingly, even when distortion occurs in the videos of the main moving body and each sub moving body and the directions of the main moving body and each sub moving body are not aligned in the input video captured by a fisheye lens camera installed on the ceiling, for example, a clear video in which no distortion occurs and the directions of the main moving body and each sub moving body are aligned can be obtained in the picture-in-picture synthesized video.

The sub picture position is determined depending on the relative position of each sub moving body with respect to the main moving body. Accordingly, the positional relationship between the plurality of moving bodies (main moving body and sub moving body) is easily recognized as compared with the related art system of the multi-window display.

As illustrated in FIG. 3, when the sub moving body approaches the main moving body, the angle of view is zoomed-out until the sub moving body is included in the main video, and the picture-in-picture synthesized video in which the sub video is superimposed at the position of the sub moving body in the main video is generated. After that, the synthesis of the main video and the sub video (generation of the picture-in-picture synthesized video) is stopped, and the main video in which no sub video is superimposed (normal single-window picture) is output. In this manner, shift (switching) from the picture-in-picture synthesized video to the normal single-window picture is smoothly performed.

Further, as illustrated in FIG. 4, when the sub moving body is apart from the main moving body after that (after the shift from the picture-in-picture synthesized video to the normal single-window picture), the synthesis of the main video and the sub video (generation of the picture-in-picture synthesized video) is resumed, and the picture-in-picture synthesized video in which the sub video is superimposed at the sub picture position is output. In this manner, the shift (switching) from the normal single-window picture to the picture-in-picture synthesized video is smoothly performed.

As illustrated in FIGS. 5 and 6, in the case of switching the main moving body (switching from the first moving body to the second moving body), the angle of view is temporarily zoomed-out until two main moving bodies (first moving body and second moving body) before and after switching are included. After that, the angle of view is zoomed-in to the main moving body (second moving body) after switching. This makes it possible to easily recognize the positional relationship between the two main moving bodies before and after switching.

As illustrated in FIG. 7, when switching of the main moving body (switching from the first moving body to the second moving body) is performed, the direction in which the angle of view is zoomed-out until the first moving body and the second moving body are included in the main video is appropriately determined as the direction in which the angle formed between the azimuth of the first moving body and the azimuth of the second moving body is small. The term "omnidirectional camera" herein described refers to a camera including a lens (such as a fisheye lens) capable of capturing an omnidirectional (360-degree) image.

In this embodiment, the moving body detected first in time series from among the plurality of moving bodies included in the input video is determined as the main moving body to be displayed in the main video. The moving body detected first in time series is an important monitoring target in many cases, so the moving body is suitably used as the main moving body.

Alternatively, as the main moving body to be displayed on the main video, a moving body located at a position closest to a center-of-gravity position of a plurality of moving bodies is determined from among the plurality of moving bodies included in the input video. When the moving body positioned at the center of the plurality of moving bodies is set as the main moving body, the other moving bodies (sub moving bodies) are located around the main moving body in a well-balanced manner, thereby suppressing occurrence of deviation of sub picture positions.

Alternatively, a moving body determined by a user input is determined as the main moving body to be displayed in the main video, from among the plurality of moving bodies included in the input video. This makes it possible to select the moving body to be confirmed in the video by the user as the main moving body.

Alternatively, the main moving body to be displayed in the main video is determined based on the attributes of each moving body from among a plurality of moving bodies included in the input video. Examples of the attributes of each moving body include moving body types (human, animal, car, etc.). When the moving body is a human, the attributes include age, gender, and clothes (for example, color of clothes and presence or absence of glasses). Note that the attributes of this moving body can be obtained by analyzing the input video (for example, image analysis such as matching with a moving body model).

In this embodiment, in the case of performing cut-out processing on the main video, cut-out processing is not performed on a portion in which the sub video is superimposed. Accordingly, the amount of operation required for the processing can be reduced by that amount. The amount of operation required for the subsequent processing (such as processing of correcting distortion and rotation) can also be reduced.

In this embodiment, when the current frame is not changed from the previous frame, the previous frame is used as it is to synthesize the main video and the sub video (generate the picture-in-picture synthesized video), thereby making it possible to reduce the amount of operation required for the processing by that amount.

Furthermore, in this embodiment, the information on the main moving body and each sub moving body is superimposed as metadata on the picture-in-picture synthesized video, so that the types of the main moving body and each sub moving body can be easily recognized by referring to the metadata. Note that the information to be superimposed as metadata may be information on the attributes of each moving body, for example. As described above, examples of the attributes of each moving body include moving body types (human, animal, car, etc.). When the moving body is a human, the attributes include age, gender, and clothes (for example, color of clothes and presence or absence of glasses). The attributes of each moving body can be obtained by analyzing the input video (for example, image analysis such as matching with a moving body model).

Second Embodiment

Next, a camera apparatus according to a second embodiment of the present invention will be described. In this embodiment, differences of the camera apparatus of the second embodiment from that of the first embodiment will be mainly described. Unless otherwise specified, the configuration and operation of this embodiment are similar to those of the first embodiment.

Figure 9:
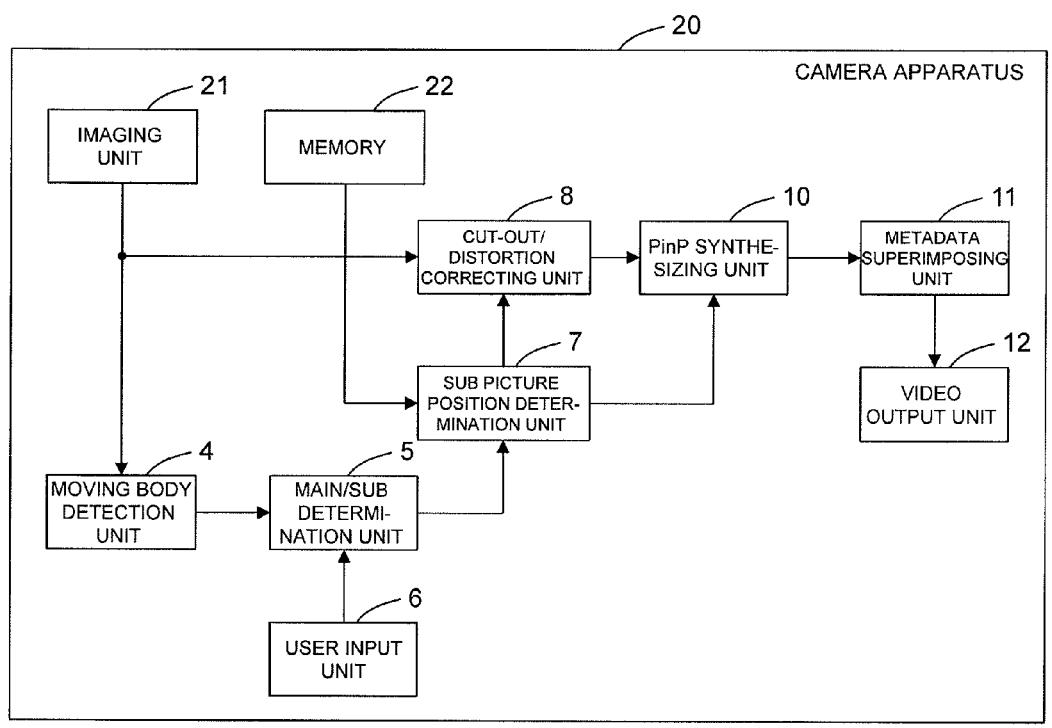
FIG. 9 is a block diagram of a camera apparatus according to a second embodiment of the present invention.

FIG. 9 is a block diagram illustrating the configuration of the camera apparatus of this embodiment. As illustrated in FIG. 9, a camera apparatus 20 of this embodiment includes an imaging unit 21 which is provided instead of the video input unit 3 of the video processing apparatus 1 of the first embodiment. The camera apparatus 20 of this embodiment includes a memory 22 that stores information on the optical characteristics of the lens (lens specification information), in place of the optical characteristic input unit 9 of the video processing apparatus 1 of the first embodiment.

Also the camera apparatus 20 of the second embodiment as described above provides the same operation and effect as those of the first embodiment.

That is, like the video processing apparatus 1 described above, also the camera apparatus 20 of this embodiment is capable of outputting videos (main video and sub video) of a plurality of moving bodies in one stream (single stream) as a synthesized video (picture-in-picture synthesized video) in which the videos are superimposed in the picture-in-picture form when the input video includes a plurality of moving bodies. In this case, the videos of the plurality of moving bodies can be combined into one stream in the picture-in-picture form, which also provides applicability to the related art system of the single-window display. The plurality of moving bodies can be displayed on one screen in the picture-in-picture form. Accordingly, a number of moving bodies can be displayed without limitation of the number of screens, unlike the related art system of the multi-window display.

In the camera apparatus 20 of this embodiment, the picture-in-picture synthesized video can be generated using an input video captured by a lens for a wide angle camera. In this case, distortion and rotation of videos due to the optical characteristics of the lens for the wide angle camera can be appropriately corrected by the cut-out/distortion correcting unit 8. Accordingly, even when distortion occurs in the videos of the main moving body and each sub moving body and the directions of the main moving body and each sub moving body are not aligned in the input video captured by a fisheye lens camera installed on the ceiling, for example, a clear video in which no distortion occurs and the directions of the main moving body and each sub moving body are aligned can be obtained in the picture-in-picture synthesized video.

Although embodiments of the present invention have been illustrated above, the scope of the present invention is not limited thereto. The present invention can be changed or modified depending on the purpose within the scope of the claims.

For example, the embodiments described above illustrates the case where the camera apparatus is a fisheye lens camera, that is, the case where a fisheye lens is used as the lens for the wide angle camera, but the scope of the present invention is not limited thereto. Examples of the lens for the wide angle camera include lens having a wider angle of view than a standard lens (not only a fisheye lens, but also a semi-wide angle lens, a wide angle lens, and a super-wide angle lens, for example).

Preferred embodiments of the present invention which are conceivable at this time have been described above. However, it is understood that various modification can be made to these embodiments and it is intended that the scope of attached claims include all modifications that fall within the true spirit and scope of the present invention.

INDUSTRIAL APPLICABILITY

As described above, a video processing apparatus according to the present invention is applicable to a system of a single-window display, has an advantageous effect of enabling display of a number of moving body without limitation of the number of screens, unlike a multi-window display, and is also applicable to a system that monitors a predetermined monitor area (shop, train station, etc.), for example, and is thus useful.

REFERENCE SIGNS LIST

1 VIDEO PROCESSING APPARATUS
2 CAMERA APPARATUS
3 VIDEO INPUT UNIT
4 MOVING BODY DETECTION UNIT
5 MAIN/SUB DETERMINATION UNIT
6 USER INPUT UNIT
7 SUB PICTURE POSITION DETERMINATION UNIT
8 CUT-OUT/DISTORTION CORRECTING UNIT
9 OPTICAL CHARACTERISTIC INPUT UNIT
10 PICTURE-IN-PICTURE SYNTHESIZING UNIT (PinP SYNTHESIZING UNIT)
11 METADATA SUPERIMPOSING UNIT
12 VIDEO OUTPUT UNIT
20 CAMERA APPARATUS
21 IMAGING UNIT
22 MEMORY

What is claimed is:

1. A video processing apparatus, comprising:
a memory; and
a video processor that executes a program such that the processor performs video processing operations, including
receiving an input video;
determining one main moving body and at least one sub moving body from among a plurality of moving bodies when a plurality of moving bodies is detected in the input video input;
cutting out a main video showing the main moving body and a sub video showing the sub moving body from the input video, when a distance between the detected main moving body and the sub moving body is greater than a predetermined value, and preparing a single video showing the main moving body and the sub moving body; and
generating a picture-in-picture synthesized video that superimposes the single video including the main video and the sub video on the main video.

2. The video processing apparatus according to claim 1, wherein the main moving body is designated by a user.

3. A video processing method, comprising:
receiving an input video taken by a camera;
detecting a plurality of moving bodies including a main moving body and a sub moving body included in the input video;
displaying a picture-in-picture video when a distance between the detected main moving body and the sub moving body is greater than a predetermined value, wherein the picture-in-picture video comprises a main video showing the detected main moving body and a sub video showing the detected sub moving body and superposed on the main video; and
displaying a single video when the distance between the detected main moving body and the sub moving body is equal to or less than the predetermined value, wherein the single video shows the detected main moving body and the sub moving body.

4. The video processing method according to claim 3, further comprising:

generating the main video showing the main moving body and corresponding to a first partial area of the input image;

generating the sub video showing the sub moving body and corresponding to a second partial area of the input image; and generating the picture-in-picture video by superposing and synthesizing the sub video on the main video.

5. The video processing method according to claim 4, further comprising:

determining a position of the sub video with respect to the main video in accordance with a position of the sub moving body in the input video; and outputting the picture-in-picture video in a one stream.

6. The video processing method according to claim 3, further comprising:

switching to display the single video when the distance changes equal to or less than the predetermined value by the main moving body moving or the sub moving body moving during displaying the picture-in-picture video.

7. The video processing method according to claim 3, further comprising:

switching to display the picture-in-picture video when the distance changes greater than the predetermined value by the main moving body moving or the sub moving body moving during displaying the single video.

8. The video processing method according to claim 3, further comprising:

zooming-in or zooming-out the main video of the picture-in-picture video in response to a change of the distance between the detected the main moving body and the sub moving body by the main moving body moving or the sub main moving body moving.

9. The video processing method according to claim 3, further comprising:

zooming-out the main video of the picture-in-picture video so that the main video includes the sub moving body when the distance between the detected the main moving body and the sub moving body is equal to or less than the predetermined value.

10. The video processing method according to claim 9, further comprising:

aligning a position of the sub video in the picture-in-picture video with a position of the sub moving body in the zoomed-out main video.

11. The video processing method according to claim 9, further comprising:

switching to display the single video from the picture-in-picture video after aligning a position of the sub video in the picture-in-picture video with a position of the sub moving body in the zoomed out main video.

12. The video processing method according to claim 3, further comprising:

zooming-in the main video of the picture-in-picture video after switching to display the picture-in-picture video from the single video.

13. The video processing method according to claim 3, further comprising:

determining the sub moving body as a new main moving body;

determining the main moving body as a new sub moving body; and then displaying a new picture-in-picture video that comprises a new main video showing the new main moving body corresponding to the sub moving body and a new sub video showing the new sub moving body corresponding to the main moving body and superposed on the new main video.

* * * * *